(12) United States Patent
Poirrier et al.

(10) Patent No.: US 8,228,974 B2
(45) Date of Patent: Jul. 24, 2012

(54) METHOD AND APPARATUS FOR RECOGNIZING A DISTURBING EFFECT IN AN INFORMATION CHANNEL

(75) Inventors: Julien Nicholas Vincent Poirrier, Locquetieau (FR); Stefan Herbst, Ludwigsburg (DE); Joerg-Peter Elbers, Backnang (DE); Helmut Griesser, Backnang (DE)

(73) Assignee: Ericsson AB, Stockholm (SE)

( * ) Notice: Subject to any disclaimer, the term of this patent is extended or adjusted under 35 U.S.C. 154(b) by 1147 days.

(21) Appl. No.: 11/577,284

(22) PCT Filed: Oct. 11, 2005

(86) PCT No.: PCT/EP2005/055154
§ 371 (c)(1),
(2), (4) Date: Mar. 3, 2008

(87) PCT Pub. No.: WO2006/040317
PCT Pub. Date: Apr. 20, 2006

(65) Prior Publication Data
US 2008/0260077 A1    Oct. 23, 2008

(30) Foreign Application Priority Data
Oct. 15, 2004    (DE) .......................... 10 2004 050 402

(51) Int. Cl.
*H03H 7/30*    (2006.01)
(52) U.S. Cl. ........ 375/229; 375/230; 375/231; 375/232; 375/136; 375/147; 375/316
(58) Field of Classification Search ................. 375/229, 375/346, 230, 231, 232, 136, 147, 316
See application file for complete search history.

(56) References Cited

U.S. PATENT DOCUMENTS

| | | | |
|---|---|---|---|
| 5,623,497 A | 4/1997 | Shimawaki et al. | |
| 7,116,454 B2* | 10/2006 | Elbers et al. | 398/25 |
| 7,139,231 B2* | 11/2006 | Nagai et al. | 369/59.22 |
| 7,231,558 B2* | 6/2007 | Gentieu et al. | 714/704 |

(Continued)

FOREIGN PATENT DOCUMENTS
DE    10164643    7/2003

(Continued)

OTHER PUBLICATIONS

Winters, Jack H. and Kasturia, Sanjay, "Adaptive Nonlinear Cancellation for High-Speed Fiber-Optic Systems", Journal of Lightwave Technology, Jul. 1992, pp. 971-977, vol. 10, No. 7.

(Continued)

*Primary Examiner* — Dhaval Patel
(74) *Attorney, Agent, or Firm* — Coats & Bennett, P.L.L.C.

(57) ABSTRACT

A device that detects an effect which distorts a communication signal in a serial communication channel comprises an input, a detector connected to the input, a demultiplexer having a data input connected to the output of the detector, and an evaluator at each output of the demultiplexer. The input receives the distorted communication signal from the communication channel. The detector detects a feature in a symbol of the distorted communication signal and outputs the detected feature. The demultiplexer outputs the detected feature and has a plurality of control inputs. A differently delayed symbol (i−1, 1, i+1) of the communication signal is applied to each input to switch the detected feature present at the input of the demultiplexer to an output of the demultiplexer specified by the symbols present at the control inputs.

27 Claims, 4 Drawing Sheets

U.S. PATENT DOCUMENTS

| | | | |
|---|---|---|---|
| 2002/0159349 A1* | 10/2002 | Katayama | 369/47.18 |
| 2003/0023912 A1* | 1/2003 | Lesea | 714/726 |
| 2003/0067974 A1* | 4/2003 | Haunstein et al. | 375/229 |
| 2003/0231743 A1* | 12/2003 | Laskowsky et al. | 379/27.01 |
| 2004/0107391 A1 | 6/2004 | Bauman | |
| 2005/0031029 A1* | 2/2005 | Yamaguchi et al. | 375/226 |
| 2006/0217096 A1* | 9/2006 | Le Goff | 455/226.1 |

FOREIGN PATENT DOCUMENTS

| | | |
|---|---|---|
| EP | 1303091 B1 | 8/2006 |
| GB | 2374758 | 10/2002 |

OTHER PUBLICATIONS

Anderson, C.J. and Lyle, J.A., "Technique for Evaluating System Performance Using Q in Numberical Simulations Exhibiting Intersymbol Interference", Electronics Letters Online No. 19940045, IEE, Nov. 8, 1993, pp. 71-72.

Mueller, K., Hanik, N., Gladisch, A., Foisel, H-M., Caspar, C., "Application of Amplitude Histograms for Quality of Service Measurements of Optical Channels and Fault Identification", ECOC 98, Sep. 20-24, 1998, pp. 707-708, Madrid, Spain.

* cited by examiner 1   optical-electrical transducer
3   source
6, 7 delay circuit
9, 11 counter
5, 10 demultiplexer
12  evaluation circuit
13  ramp generator
14  reference generator

| 15 | sample-hold circuit |
| 16 | averaging circuit |
| 18 | counter |
| 19 | adder |
| 20 | register |
| 21 | division circuit |
| 22 | demultiplexer |
| 23 | counter |

| symbol vector | signal waveform | BER | pos. PMD | neg. PMD | CD | SPM | ASE | FWM |
|---|---|---|---|---|---|---|---|---|
| 000 | 0　0　0 | $10^{-6}$ | | | | x | X | x |
| 001 | 0　0　1 | $10^{-6}$ | xx | | x | x | X | x |
| 010 | 0　1　0 | $10^{-4}$ | X | X | X | | X/x | X |
| 011 | 0　1　1 | $2 \times 10^{-5}$ | | x | xx | XX | X/x | X |
| 100 | 1　0　0 | $5 \times 10^{-5}$ | | xx | xx | x | X | x |
| 101 | 1　0　1 | $10^{-4}$ | X | X | X | x | X | x |
| 110 | 1　1　0 | $10^{-6}$ | x | | x | | X/x | X |
| 111 | 1　1　1 | $10^{-6}$ | | x | | | X/x | X |

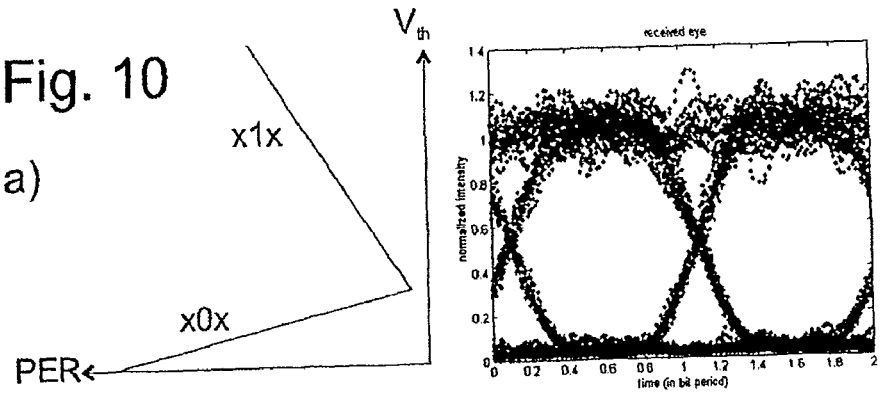
Fig. 10
a)
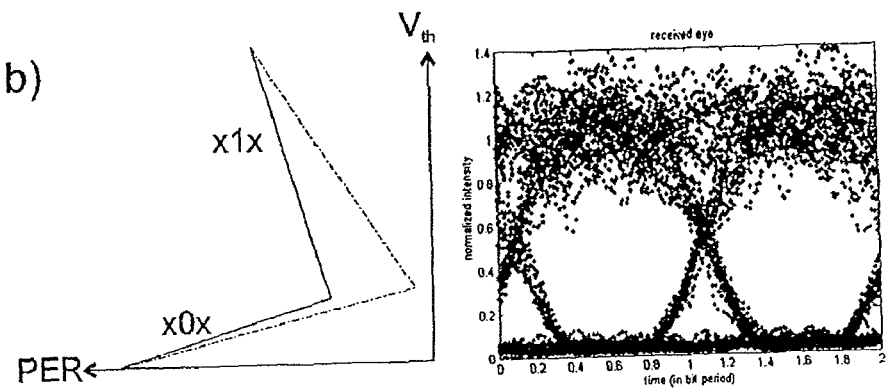
b)
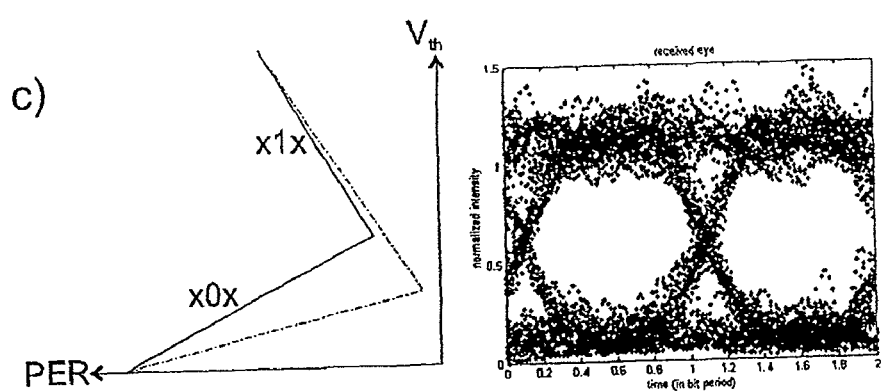
c)
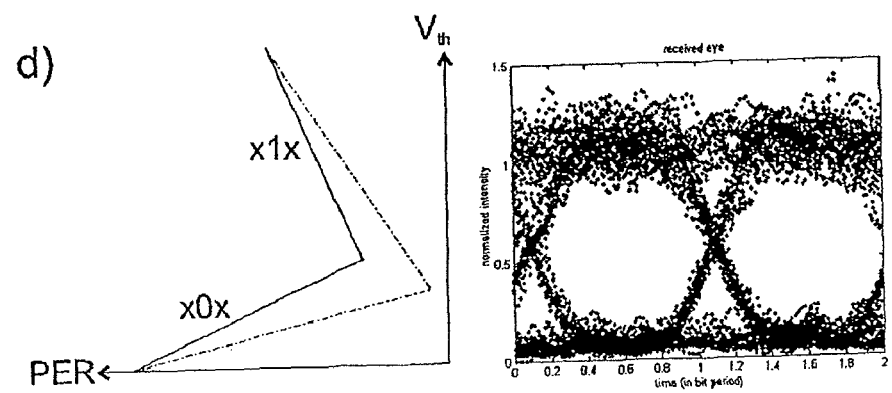
d)

METHOD AND APPARATUS FOR RECOGNIZING A DISTURBING EFFECT IN AN INFORMATION CHANNEL

The present invention relates to a method for recognizing an effect disturbing an information signal in a serial information channel.

Various disturbing effects may occur between transmitter and receiver of an information signal, regardless of whether it is an electric signal, a radio signal or an optical signal or whether the information channel is an electrical line, free space, a hollow waveguide or an optical waveguide. These disturbing effects may cause the waveform with which the information signal was generated at the transmitter to differ from the one with which it arrives at the receiver. Regardless of the type of the signal and/or the channel, an attenuation occurs which deteriorates the signal-noise ratio of the information signal. In case of wireless signals, multipath propagation may cause an alteration. Crosstalk is possible between signals which propagate on channels which are not completely separated from each other. Dispersion causes different spectral components of the information signal to propagate with different group velocities and thus to interfere at the receiver at a phase relationship different from the one with which they were generated at the transmitter. In particular in case of optical information channels, various nonlinear disturbing effects occur, which are caused by the interaction of one or more high intensity carrier lightwaves of information signals with the propagation medium, in particular with the material of an optical fibre or the like.

In order to optimise the efficiency of a network it is desirable to be able to estimate the presence of various possible disturbing effects in an information channel and, eventually, their contribution to a signal deterioration, be it in order to take constructive countermeasures for removing or at least limiting such disturbing effects or, in a complex network in which various transmission paths between transmitter and receiver are available, to choose the most appropriate one, or to judge, based on an estimate of the various disturbing effects, whether the network is operating at its limit or whether additional transmission connections between transmitters and receivers may still be established.

There is a problem in that it is difficult to judge the various possible disturbing effects in a quick and simple way. This problem is further aggravated by the fact that there are disturbing effects such as polarisation dispersion in optical fibres, the intensity of which may vary on a short time scale of milliseconds to minutes, so that it is impossible to estimate an instantaneous influence of this effect on the signals transmitted in the network, if a measurement of this effect is older than said several milliseconds to minutes.

A further problem is that for the direct measurement of the impact of these disturbing effects on the optical signal, usually part of the optical signal must be branched off, so that it is no longer available for recognizing the symbols of the transmitted signal. This intensity decrease of the optical signal further increases the probability that symbols are recognized incorrectly.

The various disturbing effects differ in terms of their impact on the waveform and the amplitude of a signal impulse, so that conventionally, for recognizing a disturbing effect, a transmitter transmits a well-characterized impulse on the transmission channel, and characteristics of the corresponding impulse arriving at the receiver are compared to the predetermined characteristics of the transmitted impulse. Such a method is complex and laborious, because it implies the presence of means for generating the well-characterised impulse on the transmitter side and of means for analysing the characteristics of the received impulse at the receiver side, and it decreases the efficiency of the network in which it is carried out, because the time required for transmitting the well-characterised impulse is not available for transmitting payload data.

The object of the present invention is to provide a method and an apparatus which allow to recognise an effect which distorts an information signal on an information channel, without decreasing the bandwidth of this channel available for transmitting the information signal.

The object is achieved by a method having the following steps:
a) defining a stet of different symbol vectors formed of $n \geq 2$ subsequent information symbols each, wherein a value from 1 to n is chosen for i, and a set of reference values of a characteristic of the i-th information symbol of the symbol vectors;
b) receiving a plurality of sequences of n information symbols transmitted on the channel;
c) for each of said symbol vectors: detecting the value of the characteristic of the i-th information symbol in all sequences corresponding to the symbol vector;
d) comparing the entirety of the values detected in step c) to the set of reference values and determining the effect to be present or not to be present based on the comparison.

The method is based on the assumption that the identification of a distorting effect does not necessarily imply that a specifically characterised impulse is transmitted and its characteristics analysed at the receiver, but that the various distorting effects have different impacts on specific characteristics, here referred to as critical characteristics, of the symbol vectors formed of n subsequent symbols, so that by measuring such a critical characteristic separately for the various symbol vectors, conclusions about the distorting effect may be drawn.

In case of a binary signal, there are $2^n$ different symbol vectors of n symbols each. The detection of the value of the characteristic can be carried out for all of these $2^n$ different symbol vectors, or only for a selection of these.

The set of reference values can be specific for a certain distorting effect, i.e. it may comprise values which would typically be measured in presence of the effect.

In order to carry out an identification of the various distorting effects, it is not necessary to be able to specify theoretically how the various effects influence given transmitted symbol sequences; it is sufficient to measure the distribution of the characteristic for the various symbol vectors in a transmission channel, for which it is known that a given distorting effect occurs there, in order to obtain a "fingerprint" of the effect in the form of a set of reference values of the critical characteristic for the various symbol vectors; then the effect may afterwards be determined to be present in a transmission channel in which the entirety of the of the detected values agrees sufficiently with said "fingerprint".

Such a set of reference values may usefully be obtained in advance by temporarily inducing the concerned effect on the information channel to be monitored, and then measuring the critical characteristic in presence of the effect.

In order to be able to recognize the presence of several different effects, a set of reference values is preferably provided for each said effect.

Since several distorting effects may occur simultaneously in a given transmission channel, the distribution of the monitored characteristic for the various symbol vectors need not coincide with a given "fingerprint" of a distorting effect, but the influences of several distorting effects on the examined characteristic may be superimposed, so that a measured distribution of the monitored characteristic is a combination, e.g. a linear combination, of several "fingerprints". It can be judged whether a given distorting effect contributes to the measured distribution by regarding, if m is the number of examined symbol vectors, the measured distribution of the examined characteristic as a characteristic vector having m components, and a distorting effect is assumed to be present if the inner product of the m-component characteristic vector and a specific m-component vector assigned to the given effect exceeds a limit.

Alternatively, the set of reference values may be typical for ordinary operation of the information channel in the absence of any distorting effects.

In this case, the presence of a distorting effect may be recognized from characteristic deviations of the detected values from the set of reference values. The reference values may be measured in advance at the same channel, if it is established by not a method different from that of the invention that the distorting effects are not present, or if a certain state of the information channel, e.g. immediately after its establishment or maintenance, is simply assumed to be good.

A critical characteristic which is suitable for such an analysis is the frequency with which, after a symbol vector transmitted by a transmitter has been distorted by a distorting effect on the information channel, the i-th information symbol of the symbol vector is identified wrongly at the receiver.

The detection of this critical characteristic is preferably carried out by deciding, if one of the symbol vectors to be examined corresponds to a received sequence of symbols, whether the i-th one of the n symbols of the sequence was received correctly or not, and by increasing or not increasing a measurement value representative of the frequency of the corruption of the i-th symbol in the sequence according to the result of the decision.

As a measurement value for a given symbol vector, there may be assumed the ratio of the number of times the i-th bit was received wrongly in a sequence corresponding to said symbol vector and a total number of times a symbol sequence corresponding to said symbol vector was transmitted. In order to determine this ratio, the number of times in which a sequence corresponding to the symbol vector was transmitted may be counted individually for each symbol vector concerned; if the number of received symbol sequences is very large and subsequent symbols of the information signal are not correlated, it may be sufficient to assume the number of times in which a symbol sequence corresponding to the symbol vector was transmitted to equal $\frac{1}{2}^n$ times the total number of examined symbol sequences for all symbol vectors.

The presence of a noise-type effect can be determined if the counting rate for different symbol vectors having the same i-th symbol, i.e. for symbol vectors which differ in their respective other symbols, is identical.

The presence of coherent noise-like effects (four-wave mixing FWM, cross phase modulation XPM, amplified spontaneous emission ASE) can be determined if the counting frequency of value vectors in which the i-th symbol equals 1 is higher than that of value vectors in which the i-th symbol equals 0. Uncoherent crosstalk is detected, if the counting rate of value vectors in which the i-th symbol equals 1 is less than that of value vectors in which the i-th symbol equals 0.

Further, first order chromatic dispersion (group velocity dispersion) may be determined to be present if the counting rate of a value vector having the symbols (0, x, 1) is the same as that of a value vector (1, x, 0), wherein x is the i-th symbol, and is higher than that of the value vector (0, 0, 0) or (1, 1, 1).

Polarisation mode dispersion may be determined to be present if the counting rate of a value vector having the symbols (0, x, 1) is different from that of a value vector (1, x, 0), wherein x denotes the i-th symbol, and is higher than that of the value vectors (0, 0, 0) or (1, 1, 1).

According to an other embodiment, the monitored critical characteristic can be an average of the signal amplitude at the time of transmission of the i-th information symbol. Also a histogram distribution of the signal amplitude at the time of transmission of the i-th information symbol can be considered.

An other critical characteristic, which is practical in the context of the present invention, is the optimum value, i.e. the value which yields the lowest error rate, of the decision threshold between two different values of the information symbol, i.e. the amplitude value above which a symbol is identified to have the value "1" and below which it is identified to have the value "0", or the deviation of the optimum amplitude value from an expected value. If no such optimum value of the decision threshold is determined, or if the decision threshold is held at a constant value, vector-dependent error rates may be used as the critical characteristic.

A particularly useful critical characteristic is the standard deviation of the signal level of the i-th information symbol, in other words, the extent to which the signal level scatters due to disturbances. The standard deviation may e.g. be obtained by forming the derivative of the error rate with respect to the decision threshold.

If the detected value of the critical characteristic is identical for different value vectors having the same i-th symbol, a noise-type effect may be assumed to be the cause of the disturbance; different values suggest intersymbol interference as a cause for the disturbance.

Further, the value of the decision threshold at which a predetermined error rate occurs can be used as the critical characteristic.

According to the type of critical characteristic used, different heuristics may result for identifying the various distorting effects.

Preferably, i is chosen greater than 1 and less than n, so that the influence both of a preceding and of a succeeding symbol on the distortion of the i-th symbol may be examined.

The number n of symbols in the symbol vector should therefore be at least n=3, preferably exactly n=3.

An apparatus for carrying out the method described above comprises an input for receiving the information signal distorted on the information channel, a device connected to the input for detecting a feature of a symbol of the distorted information signal and outputting the detected feature, a source for an undistorted information signal synchronised to and equal in contents to the distorted information signal, a demultiplexer having a data input connected to the output of the detection means for outputting the detected feature, and a plurality of control inputs, that have differently delayed symbols of the undistorted information signal applied to them in order to switch the detected feature present at the input of the demultiplexer to an output of the demultiplexer specified by the symbols present at the control inputs, and an evaluating unit at each output of the demultiplexer.

According to a first embodiment, the detected feature indicates for each symbol whether it was received correctly or wrongly. Similarly, preferably, each evaluating unit comprises a first counter for counting how often the signal indicating wrong receipt (or correct receipt) of a symbol was switched to the evaluating unit. A second counter may be provided at each evaluating unit for counting how often the output of the demultiplexer associated to the evaluating unit was specified by the symbols present at the control inputs of the latter.

According to another embodiment, the detected value indicates for each symbol the signal amplitude thereof and the evaluating unit comprises a circuit for forming an average or a histogram of the signal amplitude.

Further features and embodiments of the invention become apparent from the subsequent description of embodiments referring to the appended figures.

Figures 8, 9:
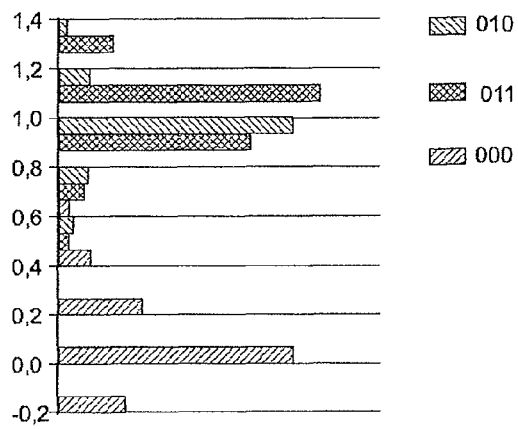
FIG. 8 shows examples of histograms of the signal levels of the central bit for various three-bit symbol vectors.

FIG. 9 is a table indicating typical signal waveforms, error rates and the extent of the dependence of the error rates on the most important distorting effects observed in an exemplary information channel for all three-bit symbol vectors; and FIG. 10 shows eye opening and PER diagrams for an undisturbed information channel and for an information channel disturbed by various noise-type effects, respectively.

Figure 1:
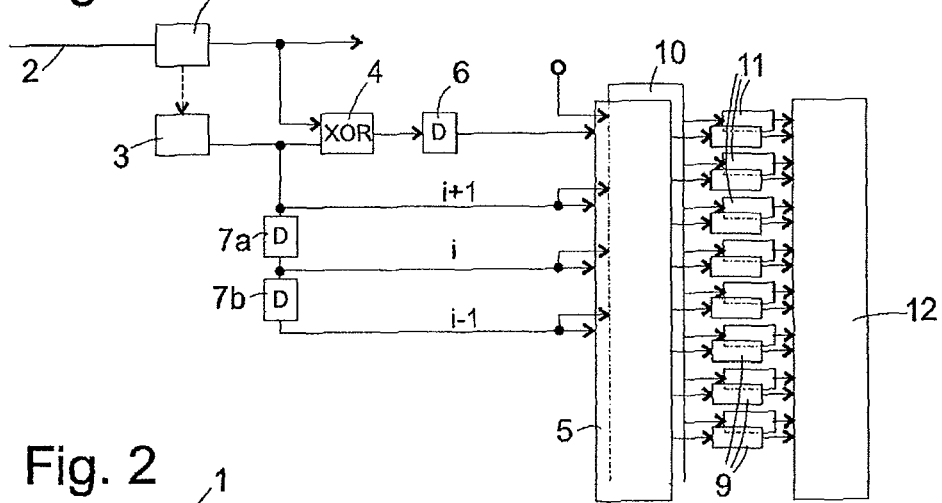
FIG. 1 is a block diagram of a circuit for symbol-vector-dependent detection of the bit error rate of a distorted received signal.

In FIG. 1, 1 is an optical-electrical transducer which is connected to a serial information channel formed by an optical fibre 2 in order to provide an electrical signal formed of a sequence of zeros and ones according to the intensity of a light signal received on the fibre 2. The light signal is originally provided by a transmitter, not shown, at another end of fibre 2, and may take two different power levels, a low one representing a bit of value zero and a high one representing a bit of value one. The signal is therefore a binary signal; each symbol of the signal represents one bit, so that the terms symbol and bit are subsequently employed without distinction.

Due to distorting effects occurring on the fibre 2, the waveform of the light intensity received by transducer 1 may differ from the light intensity emitted by the transmitter, so that the bit sequence provided at the output of the transducer 1 may comprise wrongly recognised bits. Reference 3 denotes a source for an error-free information signal which is assumed to correspond to the signal transmitted by the transmitter. The type of this source 3 is without importance for the present invention; it may e.g. be assumed that in the information signal transmitted on the fibre 2, error correction information is contained in addition to the telecommunication information proper, which enables the source 3 to detect errors in the communication information, to correct them und thus to provide an error-free signal.

The communication signals from the transducer 1 and from the source 3 are applied in bit-synchronism to an XOR gate 4. In order to ensure bit-synchronism, a delay circuit, not shown, may be inserted between the transducer 1 and an input of the XOR gate 4 connected to it, the delay time of which corresponds to the time needed by the source 3 to carry out the error correction.

The XOR gate 4 provides an output signal having the value 1, if its two input signals are different, i.e., if a bit has been wrongly recognised in transducer 1, and a zero output signal otherwise. This output signal reaches the data input of a demultiplexer 5 via a delay circuit 6 in which it is delayed by one bit period.

The demultiplexer 5 has three control inputs, to which the output signal of the source 3 is applied without delay and delayed by one and two bit periods, respectively, by delay circuits 7a, 7b connected in series. I.e. while at the data input of demultiplexer 5, a signal is present which indicates whether an i-th bit of the communication signal transmitted on fibre 2 was received wrongly or correctly, this i-th bit and the i−1$^{st}$ one and the i+1$^{st}$ bit of the communication signal are present at the control inputs of the demultiplexer 5 and cause the signal present at the data input to be switched to an output among the $2^3$=8 outputs of the demultiplexer 5 defined by the values of the bits i−1, i, i+1.

Each of these outputs has a counter 9 connected to it which is incremented when it receives within a bit period a signal having the value 1 from the demultiplexer 5. I.e. each counter 9 has one of the eight symbol vectors (0, 0, 0), (0, 0, 1), (0, 1, 0), . . . , (1, 1, 1) associated to it, which may be formed from three subsequent bits, and it counts the frequency with which the central bit of the associated symbol vector is recognized wrongly in transducer 1.

A second demultiplexer 10 has a signal input, to which a constant signal having the value "1" is supplied, and control inputs which have the bits i−1, i and i+1 applied to them in parallel to the demultimplexer 5. Each of its eight outputs has a counter 11 connected to it. While the counters 9 count the frequency of a wrong detection of the i-th bit for each symbol vector, the counters 11 count the frequency of the occurrence of the corresponding symbol vector. An evaluation circuit 12 connected to the outputs of counters 9, 11 is therefore capable of reading, for each symbol vector, the ratio of the error frequency and the occurrence frequency of the corresponding symbol vector from the counters 9, 11, and the distribution of the error frequency to the various symbol vectors allows in a way to be detailed later a conclusion as to which distorting effect might eventually be occurring in the fibre 2, causing the errors.

Figure 2:
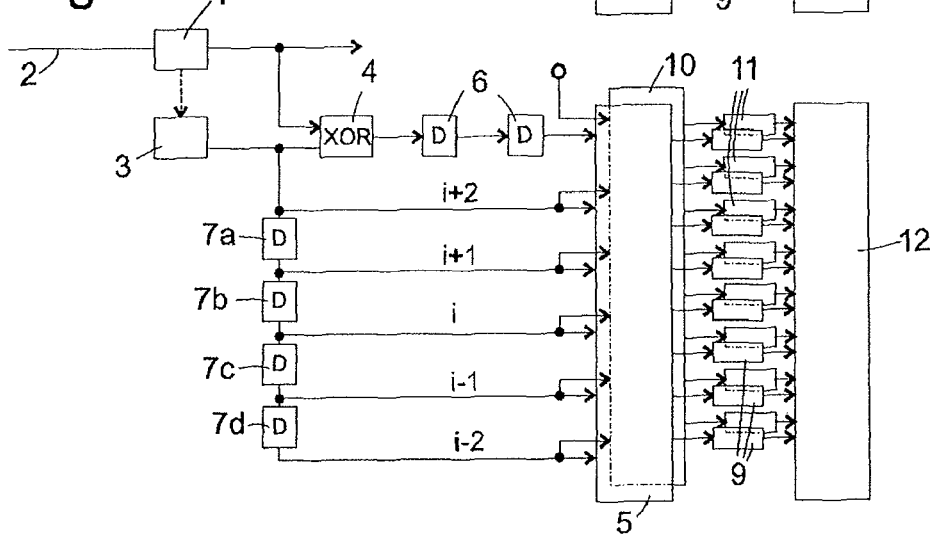
FIG. 2 is a modification of the circuit of FIG. 1.

FIG. 2 illustrates a modification of the circuit of FIG. 1, in which each of the demultiplexers 5, has five control inputs to which bits i−2, i−1, . . . , i+2 successively provided by the source 3 are applied, and in which a second delay circuit 6 is inserted between the XOR gate 4 and the data input of the demultiplexer 5, so that, as in case of FIG. 1, the signal present at the data input of the demultiplexer 10 indicates whether bit i was detected wrongly in transducer 1.

This circuit allows to distinguish between $2^5$=32 different symbol vectors, so that for each of these vectors the error probability may be detected individually, provided that a corresponding counter 9 is connected to an output of the demultiplexer 10 associated to this symbol vector.

In order to keep the circuit complexity low, it may be provided that only selected ones of the 32 possible symbol vectors have a counter 9 (and a counter 11 at demultiplexer 10) associated to them. It may thus be useful to provide counters only for those of the eight symbol vectors where the bits i+1, and i+2 are identical, and the bits i−1 and i−2 are identical.

A disadvantage of the use of long symbol vectors as in the embodiment of FIG. 2 is that the statistical basis for calculating an error rate for the individual symbol vectors in the information circuit 12 and, hence, the significance of such an error rate decreases the more, the larger the number of symbol vectors to be examined individually is. If it is assumed that the probability of wrongly detecting a bit i in transducer 1 is essentially influenced by the immediately adjacent bits, and the influence of farther remote bits becomes the smaller, the larger the distance is, then it is to be expected that the embodiment of FIG. 2 is useful mainly if there are high error rates which enable significant statistics even at short measuring times, or if the distorting effects to be identified change only slowly with time, so that long measuring times for error rates are available.

Figure 3:
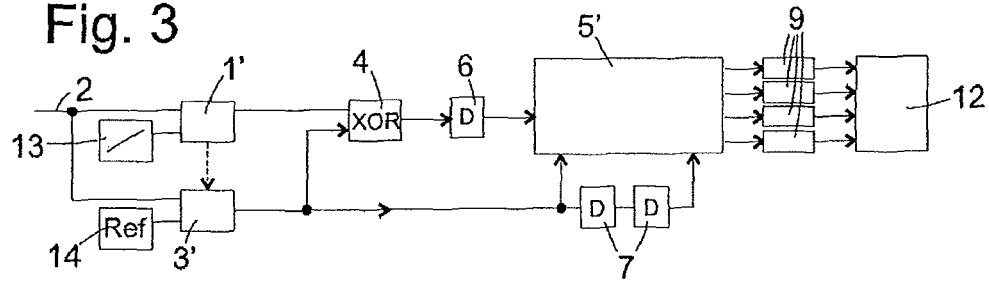
FIG. 3 is a block diagram of a circuit for detecting the pseudo error rate or the eye opening of the distorted information signal.

A second embodiment of an apparatus for identifying a distorting effect occurring in an optical fibre 2 is represented in FIG. 3. A first optical-electrical transducer connected to the fibre 2 and providing a binary electrical output signal is denoted 1', similar to FIGS. 1 and 2. The transducer 1' receives from a ramp generator 13 a decision threshold signal $V_{th}$ which is variable with time. The level of the decision threshold signal $V_{th}$ is representative of a threshold power of the optical signal on fibre 2, above which a symbol transmitted on the fibre 2 is identified as "1" by transducer 1, and below which it is identified as "0".

A second optical-electrical transducer, which may be identical in construction to the transducer 1' and is connected to the fibre 2 in parallel to transducer 1' receives a constant decision threshold signal Vref from a reference generator 14. The level of this decision threshold signal Vref is assumed to be optimum, and, correspondingly, the decision of the second transducer on the value "0" or "1" of a transmitted bit is assumed to be error-free. The function of the second transducer corresponds to the source 3 assumed to be error-free of FIGS. 1 and 2, which is why it is referred to by 3'.

An XOR gate 4 connected to the outputs of converters 1', 3' provides an output signal "1" whenever the decisions of the transducers 1', 3' differ from each other, and "0" otherwise. The output signal of the XOR gate is applied via a delay circuit 6 having a delay of one bit period to the data input of a demultiplexer 5', which, unlike the demultiplexers 5 of FIGS. 1 and 2, only has two control inputs which respectively have the undelayed output signal of the second transducer 3' and the output signal of the second transducer 3' delayed two bit periods by delay circuits 7 applied to them, in order to determine to which one of the counters 9 connected to the four outputs of the demultiplexer 5' the value present at the data input is switched.

As is easily understood, the value "0" is applied to the data input of demultiplexer 5' whenever the level of the decision circuit signal $V_{th}$ from ramp generator 13 agrees with $V_{ref}$ from reference generator 14. If the decision level signal $V_{th}$ from the ramp generator becomes less than $V_{ref}$, a i-th bit often has the value "1" assigned to it although the correct value would have been "0". How often this happens depends on the noisiness of the signal arriving via fibre 2 and the intensity of distorting effects on the fibre 2. In case of each such error, one of the counters 9, which is defined by corresponding previous and subsequent bits i−1, i+1, is incremented. Since the level of the decision threshold signal $V_{th}$ may in principle be determined arbitrarily and may depend strongly on $V_{ref}$, high counting rates of deviations between the decisions of the converters 1', 3', so called pseudo errors, may be obtained, so that short measuring times are sufficient for generating a statistically significant counting value in the counters 9. These counting rates are read by the evaluation circuit 12, after a predetermined measuring time has elapsed. It may be provided that the ramp generator 13 modifies the level of the decision threshold signal $V_{th}$ output by it in steps after reading and resetting the counters 9; alternatively, a continuous change of the level may be provided, wherein the evaluation circuit 12 reads the counters 9 repeatedly and resets them, while the decision threshold signal from ramp generator 13 changes slowly from one extreme level to the other.

Figure 4:
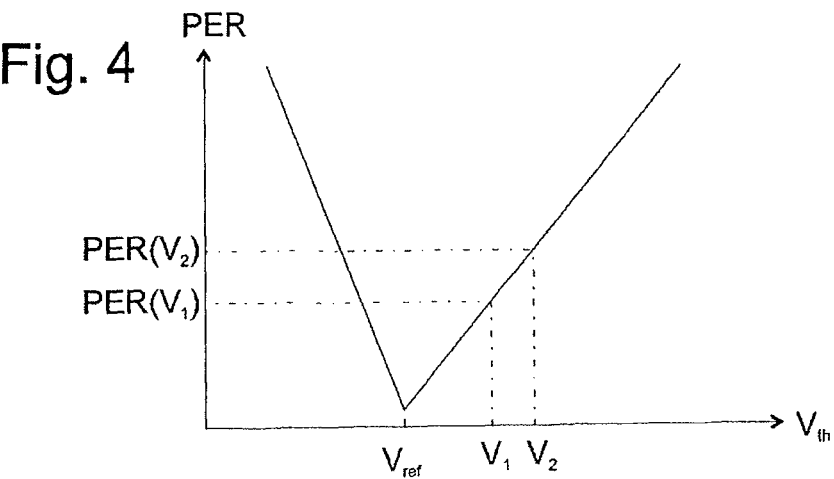
FIG. 4 is a graph for illustrating the operation of the circuit of FIG. 3.

The diagram of FIG. 4 shows a typical relationship between the pseudo error rate PER detected by one of the counters 9 and the level $V_{th}$ of the decision threshold signal from ramp generator 13. The pseudo error rate PER reaches a minimum when $V_{th}$ coincides with the level $V_{ref}$ of reference generator 14; above and below this value, an approximately linear dependence of the pseudo error rate from the decision threshold $V_{th}$ is observed. The contributions of the slopes of two branches of the curve at different sides of the minimum of the PER at $V_{th}=V_{ref}$ are a measure for the standard deviation of the level of the i-th bit or its noisiness in case of the bit having a value "0" (for the branch having $V_{th}>V_{ref}$) and of "1", respectively (for the branch having $V_{th}<V_{ref}$).

If $V_{th}$ is less than the true decision threshold for the decision between "0" and "1"—preferably, this true decision threshold should be identical to $V_{ref}$, but it may also differ from it and in particular be dependent on the values of preceding and subsequent bits—this i-th bit is recognised correctly in a bit sequence, the i-th bit of which is "1", whereas recognition errors may occur if the i-th bit is "0". Conversely, if $V_{th}$ is higher than the true decision threshold, a i-th bit of value "0" is reliably recognised correctly and in recognition of the i-th bit of value "1" errors occur. Although the multiplexer of this embodiment only has four outputs, the pseudo error rate may be detected separately for all eight existing three-bit symbol vectors by reading and evaluating separately the pseudo error rates counted for times when $V_{th}<V_{ref}$ and when $V_{ref}<V_{th}$, respectively, from counter 9, or pseudo error rates may be detected as a function of the decision threshold.

In order to judge the amount of the derivative for each branch, the evaluation circuit may divide the difference of pseudo error rates PER $(V_1)$ and PER $(V_2)$ of levels $V_1$, $V_2$ of the decision threshold signal belonging to a same branch by the difference of these levels:

$$\frac{PER(V_2) - PER(V_1)}{V_2 - V_1}$$

or it may form the ratio of PER $(V_1)$ and $|V_1-V_{ref}|$.

If it is assumed that the two branches of the pseudo error rate have a constant slope as shown in FIG. 4, the two above alternatives for calculating the slope are equivalent. However this need not generally be true. In order to ensure that slopes of the pseudo error rate obtained for different symbol vectors are comparable, it may be provided that for all symbol vectors the value of level $V_{th}$ at which the pseudo error rate for the concerned symbol vector has predetermined value, e.g. PER $(V_1)=10^{-3}$, is used as the level $V_1$. As $V_2$, a level may be chosen which differs from $V_1$ by a predetermined difference identical for all symbol vectors or at which a second value of the pseudo error rate, e.g. PER $(V_2)=2\times10^{-3}$, occurs.

The slopes determined individually for the eight three-bit symbol vectors allow conclusions about the signal-distorting effects effective in fibre 2, as will be described in more detail later on.

Instead of the derivative of the two branches, in the embodiment of FIG. 3 simply those values of $V_{th}$ may be determined at which the two branches of the pseudo error rate reach a same predetermined value, e.g. $10^{-4}$. Also this value—or the amount of the differences between these two values and the optimum decision threshold—assumes different values for different symbol vectors, which values depend on the presence of disturbing effects on the fibre 2.

Figure 5:
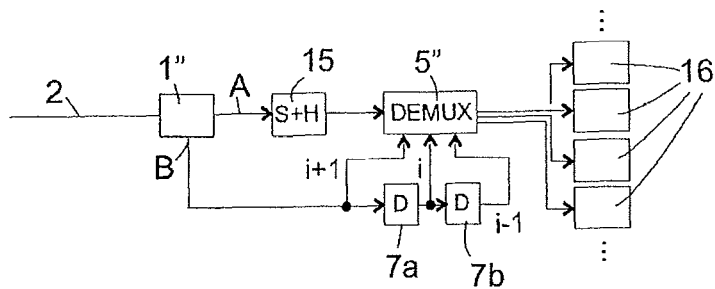
FIG. 5 is a block diagram of a further embodiment of a circuit for symbol-vector-dependent detection of a characteristic of an information signal.

A further embodiment of the apparatus of the invention is shown as a block diagram in FIG. 5. An optical-electronic transducer 1" has an analog output A, where an analog electric signal is output, the voltage of which follows as closely as possible the power received from fibre 2, and a digital output B, at which a sequence of binary symbols or bits its output which reproduces the originally transmitted communication signal without errors (like the output signal of source 3 in FIG. 1) or with a small proportion of errors (like the output signal of transducer 1 in FIG. 1). A sample-hold circuit 15 is connected to the analog output A in order to sample its level at a predetermined instant of the bit period of the communication signal and to hold it.

The output signal of the sample-hold-circuit 15 is present at the data input of an analog demultiplexer 5", the three control inputs of which have the binary values of three subsequent bits i−1, i, i+1 from binary output B, eventually delayed by delay circuits 7, applied to them. The time delay in the sample-hold circuit 15 is set so that it outputs a sampled analog voltage level to the dempultiplexer 5" at an instant at which the latter receives at its control inputs the bit i from which the sampling value originates, the preceding bit i−1 and the subsequent bit i+1. According to the symbol vector formed by the three bits i−1, i, i+1, the demultiplexer 5" switches the sampling value to one of eight averaging circuits 16 which calculate for each symbol vector the average level of the i-th bit at the sampling instant of the sample-hold circuit.

Figure 6:
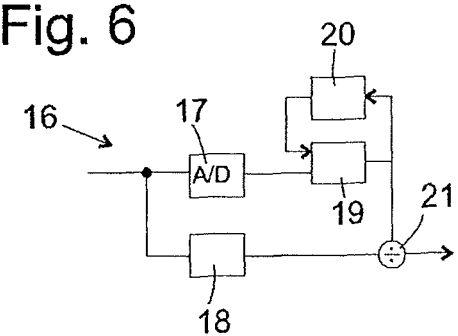
FIG. 6 is a detail of FIG. 5 according to a first embodiment.

FIG. 6 illustrates a realisation of an averaging circuit 16. Its input is formed by an analog-digital-converter 17 and a counter 18 which is incremented by each arrival of a datum to be digitised at the converter 17. An adder 19 has two inputs, one of which is connected to the output of the converter 17 and the other of which is connected to the output of a register 20, the input of which is connected to the output of the adder 19, so as to successively add the values output by the converter 17. A division circuit 21 provides the output of the averaging circuit by dividing the output of the adder 19 by that of the counter 18.

Figure 7:
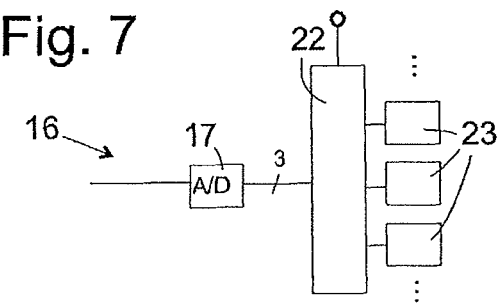
FIG. 7 is the same detail according to a second embodiment.

In a fourth embodiment of the apparatus of the invention, histogram generating circuits 16 are provided instead of the averaging circuits, otherwise the block diagram of this embodiment is identical to that of FIG. 5. A histogram generating circuit can e.g. be formed, as shown in FIG. 7, by an analog-digital converter 17 having a resolution of three bits, a demultiplexer 22 controlled by the output of the converter 17, and counters 23, each of which is connected to one of the eight outputs of the demultiplexer 22, and which are incremented, similar to the counters 11, each time when they are addressed by demultiplexer 22. If 0 and 1 correspond to the analog desired levels of bits of logical value "0" and "1", respectively, the converter 17 is set to provide a digitisation result 000 binary at an amplitude value between −0.2 and 0, a digitisation result 001 at an amplitude value between 0 and 0.2 and so on, up to an amplitude value of 1.2 to 1.4 which corresponds to the digitisation result 111 binary.

Examples of such histograms are shown as illustrations in FIG. 8 for symbol vectors [010], [011] and [000]. In particular the different histograms of the symbol vectors [010] (represented by downward-hatched-bars) and [011] (represented by crosshatched-bars) show that due to a distorting effect the value 0 or 1 of a third bit has a non-negligible influence on the frequency with which specific amplitude values are sampled for the second bit. For example, amplitude values between 1.0 and 1.4 of the second bit are sampled more frequently for the symbol vector [011] than for the symbol vector [010], whereas amplitude values below 1.0 occur more frequently for the symbol vector [010].

The identification of a distorting effect is possible in essentially the same way with all embodiments of apparatus according to the invention described above. In order to carry out the identification, it is a priori not even compulsory to be able to calculate or describe the impact of the various distorting effects on a communication signal in detail. What is required is only, for each effect to be identified, a transmission line in which it occurs. Along this transmission line, an arbitrarily selected communication signal, preferably a random signal, is transmitted from a transmitter to the identification apparatus. The identification apparatus thus obtains, depending on its type of embodiment, for each symbol vector the transmission error rate, a measure of the noisiness, the average amplitude of a sampling value or a histogram of the amplitude distribution of a sampling value or any other characteristic of the transmitted communication signal that may not be mentioned above and is influenced by the concerned effect. The entirety of the values $c_i$ of this characteristic obtained for all symbol vectors forms a type of "fingerprint" or characteristic vector $C=\{c_i\}$ of the concerned distorting effect, wherein the index i=1, 2, . . . $2^n$ denotes one of the symbol vectors, and the number of components of the characteristic vector equals the number of symbol vectors.

If the characteristic vectors C for each distorting effect are known, a corresponding characteristic Vector $D=\{d_i\}$ may be determined accordingly for an arbitrary communication channel such as the fibre 2, for which it is a priori not known which distorting effects occur in it. An identification of a distorting effect is carried out by comparing the thus obtained characteristic vector D with the set of characteristic vectors C, and the effect whose characteristic vector C has the highest degree of similarity to D is assumed to be present.

The similarity of the different vectors C and D may be defined in different ways. In particular, a normalised inner product a of the form $$a = \sum_i c_i d_i \Big/ \sum_i c_i^2$$

may serve as a measure of similarity.

In order to identify other, weaker distorting effects, the contribution of the first effect may be subtracted from the characteristic vector of the communication channel:

$$D \leftarrow D - aC,$$

and for the thus obtained remainder of the characteristic vector D, the search for the most similar vector C is repeated.

Alternatively, a diagnosis of distorting effects occurring on a given communication channel is possible based on the knowledge of the impact of these effects on the transmitted signals, as illustrated in the following based on FIG. 9. FIG. 9 is a table of eight lines, each of which corresponds to one of the eight three-bit symbol vectors. Column 2 illustrates a typical waveform of the signal distorted in the communication channel corresponding to the concerned symbol vector. Column 3 gives bit error rates BER measured in the communication channel for the various symbol vectors. (I.e. the eight error rates of this column form the characteristic vector D of the communication channel. These bit error rates are highest for the vectors [010] and [101], and somewhat smaller for the symbol vectors [100] and [011], respectively. The bit error rates of the other symbol vectors are of little importance when compared to these. I.e. the bandwidth of the communication line is limited mainly by the symbol vectors [010] and [101] and, to a lesser extent, by [100] and [011].

The following columns of the table describe the influence of various distorting effects on the error rate of the various symbol vectors; they illustrate in qualitative form the above mentioned characteristic vectors C of the individual effects.

There are two types of polarisation dispersion (PMD). We speak of positive polarisation dispersion here if in a birefringent fibre a communication signal propagates predominantly in the slow polarisation mode, and the appearance of a fast polarisation mode of the same communication signal causes a bit of the communication signal to be distorted by the fast portion of a later transmitted bit, which has not yet been received in the slow polarisation mode. Positive polarisation dispersion thus increases the error rate of the recognition of the second bit of symbol vectors in which the second and third bits are different. The amount of the disturbance by positive polarisation dispersion (and by other distorting effects still to be discussed) is represented in the Fig. by crosses of different numbers and sizes in a column of the table corresponding to the effect concerned, wherein a large cross denotes a very strong influence (i.e. a very high amount of the corresponding characteristic vector component $c_i$), two small crosses denote a slightly less strong influence and a single small cross a moderately strong influence of the symbol vector on the error rate (i.e. a somewhat less strong/moderately strong contribution of the corresponding characteristic vector component $c_i$).

Negative polarisation dispersion is present if a communication signal transmitted predominantly in the fast polarisation mode of a birefringent fibre is corrupted by a disturbing signal propagating in the slow polarisation mode. Negative polarisation dispersion thus increases the error rate particularly of those symbol vectors in which the first two symbols are different from each other.

Chromatic dispersion (CD) implies a distortion of a transmitted bit both by a previously transmitted one and by a subsequently transmitted one. The characteristic vector of a communication channel suffering from chromatic dispersion therefore corresponds to the sum of the characteristic vectors of positive and negative polarisation dispersions. Since the two types of polarisation dispersion cannot occur simultaneously, a distinction between chromatic dispersion and polarisation dispersion is possible: in the case considered in FIG. 8, the symbol vectors [011] and [100] have a moderate bit error rate BER, which would compatible both with negative polarisation dispersion and with chromatic dispersion. Since the bit error rate for the symbol vectors [001] and [110] is low, chromatic dispersion cannot be the cause for the distortion, and negative polarisation dispersion must be the cause of the distortion.

Self phase modulation (SPM) impacts mainly on the error rate of the first bit in a sequence of several bits of value 1, i.e. on the symbol vector [011], and is therefore easily recognized in the characteristic vector D of a communication channel.

The influence of noise-type effects such as amplified spontaneous emission (ASE) on the error rate of a bit is independent of the values of preceding and subsequent bits.

Four-wave mixing (FWM) with another communication channel can here also be regarded as a noise-type (or stochastic) effect, since the amount of the four-wave mixing is related to the signal level on the other channel and is therefore not correlated with the signal level of the observed communication channel. However, since four-wave mixing requires a non-vanishing signal intensity in the observed channel, its influence on the error rate is higher in symbol vectors having a central bit 1 than in symbol vectors having a central bit 0. I.e. if only the error rate is determined without optimising the decision threshold based on this error rate, then the error rate as such is a critical characteristic. If the error rate is optimised by varying the decision threshold, then die difference between the optimised level of the threshold and an expected level may be taken as the critical characteristic.

If the crosses in FIG. 9 (which represent nothing else than qualitative amounts) are replaced by figures, e.g. by setting $X=10^{-4}$, $xx=5\times10^{-5}$, $x=10^{-6}$, in order to obtain characteristic vectors C having numerical coefficients for the various effects, it is easily recognised that in the example case considered here the inner product a=CD is highest for negative PMD and that negative PMD is therefore probably the cause of the observed errors. If the contribution explainable by a negative PMD is subtracted from the characteristic vector D according to the formula $$D'=D-aC,$$

the result D' has a same value for almost all components (except the one corresponding to the symbol vector [100]) and is therefore attributed mainly to ASE or a combination of ASE and FWM.

The inner product a may be regarded as a qualitative measure for the strength of the distorting effect for which it was calculated. Based on scalar products obtained at different times for the same effect, the development of the concerned effect with time may be judged.

The methods described above for recognizing or identifying an effect distorting the communication signal where based on the detection of a critical feature of the i-th symbol of the various symbol vectors and a comparison of the distribution of the feature to distributions expected for the various symbol vectors in presence of a certain distorting effect, and the determination of the effect to be present if the detected distribution agreed sufficiently with the expected one. This procedure is rather laborious, since it requires a comparison procedure of its own for every distorting effect, and the possibility is not excluded that, although the information channel is disturbed, this is not recognized, because the disturbance is not caused by one of those effects for which a comparison is carried out. This problem may be solved by first comparing the set of the values of the critical characteristic measured for the various symbol vectors to a reference set which was obtained from the same communication channel at an earlier time at which it was either determined by experiment or reasonably assumed that no distorting effects were present at that time. If there is sufficient agreement between this reference set and the currently measured set, the communication channel at the present time may be assumed to be free of the distorting effects and it is not necessary to check for each of the various distorting effects whether it is present or not. However, if the current set differs substantially from the reference set, a distorting effect must be present, and further comparisons may be carried out in order to determine which effect it is. This procedure is generally applicable for any critical characteristic; it is explained as an example in the following based on the pseudo error rate as a critical characteristic, referring to FIG. 10.

Part a of FIG. 10 shows a typical eye diagram of a communication signal assumed not to be disturbed, in which a plurality of waveforms of the level of the communication signal is plotted as a function of time for various symbol periods, and at the left hand side thereof, there is an associated PER diagram, the decision threshold $V_{th}$ axis of which is parallel to the signal level axis of the eye diagram. As can be easily seen in the eye diagram, the scatter of the level of the communication signal is higher for symbols having the value "1" than for those having the value "0", which is reflected in the PER diagram by the fact that the branch x1x of the PER curve (the upper branch in this figure) corresponding to symbol vectors having the central symbol "1" has a smaller slope than the branch x0x corresponding to the symbol vectors having the central bit "0".

A coherent noise-type interference such as coherent crosstalk, cross phase modulation and four-wave mixing causes a much stronger scatter for symbols having the value "1", as can be seen in the eye diagram of FIG. 10b, but they have only little impact on the symbols of value "0", which is reflected in the PER diagram by the fact that the slope of the branch x1x is noticeably less than that of the undisturbed case represented by a dash-dot line, whereas the slope of the branch x0x changes only insignificantly.

Incoherent crosstalk has an effect both on the signal levels of the "0" symbols as of the "1" symbols, but due to the inherently stronger noise of the "1" level, it is more distinctly seen in the branch x0x (FIG. 10c). Amplified spontaneous emission contains both coherent and incoherent contributions and has an effect on both branches of the PER diagram as shown in FIG. 10d.

In order to monitor the occurrence of distorting effects in a communication channel according to the invention, the standard deviation of the level for symbols "0" and "1" is determined in advance by a PER diagram. Later, when the channel is in operation, these standard deviations are determined for the second symbol of the eight different three-bit symbol vectors, and the obtained standard deviations are compared to the reference values. If the detected standard deviations for all symbol vectors having the second symbol "0" coincide with the reference standard deviation for the symbol "0" and the standard deviations for all symbol vectors with the second symbol "1" coincide with the reference standard deviation of the symbol "1", a noise-type effect must be the cause of the disturbance, and by comparing the measured standard deviation with the reference values based on the criteria explained referring to FIG. 10, it is decided whether the disturbance is due to coherent crosstalk, to cross phase modulation or four-wave-mixing or to non coherent crosstalk or to ASE.

However, if the standard deviations for symbol vectors having the central bit "0" and symbol vectors having the central bit "1" differ, there must be a mutual influence of subsequent symbols of the communication channel, i.e. intersymbol interference, at the origin of the disturbance. In analogy to what is described referring to FIG. 9, an effect that causes the disturbance may be identified based on size relations of the standard deviations of different symbol vectors characteristic for this effect.

The invention claimed is:

1. A method of recognizing an effect distorting a communication signal in a serial communication channel, comprising:

defining a set of different symbol vectors formed of n>=2 successive communication symbols and a set of reference values of a critical characteristic of an i-th communication symbol of the symbol vectors, wherein a value from 1 to n is chosen for i;

receiving a plurality of sequences of n communication symbols transmitted on the channel;

for each of the symbol vectors, detecting the value of the critical characteristic of the i-th communication symbol in all received sequences corresponding to that symbol vector;

comparing the set of values detected to the set of reference values and judging the effect to be present or not present based on the comparison;

wherein the critical characteristic comprises a measure of a frequency with which the i-th communication symbol of the symbol vector is incorrectly identified after the symbol vector has been distorted by that effect; and determining, when one of the symbol vectors corresponds to the received sequence, whether the i-th one of the n symbols (i=1, . . . , n) of the sequence was correctly received, and conditionally incrementing a measurement value representative of the frequency of the incorrect identification of the i-th symbol in the sequence corresponding to the symbol vector based on the result of the determination.

2. The method of claim 1 wherein the serial communication channel is an optical fibre and wherein the distorting effects are optical effects.

3. The method of claim 1 wherein the set of reference values comprises values of the critical characteristic indicative of the presence of the distorting effect for the individual symbol vectors, and wherein the distorting effect is judged to be present if the set of detected values is sufficiently similar to the set of reference values.

4. The method of claim 3, wherein the set of reference values is obtained by temporarily and arbitrarily inducing the effect in the communication channel and measuring the critical characteristic for each symbol vector.

5. The method of claim 1 wherein the set of reference values comprises values of the critical characteristic typical of proper functioning of the communication channel for the individual symbol vectors, and wherein the presence of the distorting effect is determined based on deviations of the set of detected values from the set of reference values being typical of the effect.

6. The method of claim 5 wherein the set of reference values is obtained by measurement at the communication channel when the channel is functioning properly.

7. The method of claim 1 wherein for each symbol vector, the measurement value is the ratio of a number of times in which the i-th symbol was wrongly received in a sequence corresponding to the symbol vector to the number of times in which a sequence corresponding to the symbol vector was transmitted.

8. The method of claim 1 wherein a coherent noise-like effect is determined to be present if a counting frequency of value vectors in which the i-th symbol equals 1 is higher than that of value vectors in which the i-th symbol equals 0.

9. The method of one of claim 1 wherein non-coherent crosstalk is determined to be present if a counting frequency of value vectors in which the i-th symbol equals 1 is less than that of value vectors in which the i-th symbol equals 0.

10. The method of claim 1 wherein chromatic dispersion is determined to be present if the counting frequency of a value vector with symbols (0, x, 1) is the same as that of a value vector (1, x, 0), wherein x denotes the i-th symbol, and is higher than that of the value vector (0, 0, 0) or (1, 1, 1).

11. The method of claim 1 wherein polarization dispersion is determined to be present if a counting frequency of a value vector with symbols (0, x, 1) is different than that of a value vector (1, x, 0), wherein x denotes the i-th symbol, and is higher than that of a value vector (0, 0, 0) or (1, 1, 1).

12. The method of claim 1 wherein the critical characteristic further comprises a value of a discrimination threshold between two values of the i-th communication symbol which yields a lowest error rate when identifying the i-th symbol.

13. The method of claim 1 wherein the critical characteristic further comprises a measure for a standard deviation of a signal level of the i-th communication symbol.

14. The method of claim 13 wherein intersymbol interference is determined to be present if the detected value of the critical characteristic has different values for different value vectors having the same i-th symbol.

15. The method of claim 13 wherein a noise-type effect is determined to be present if the value of the critical characteristic detected is the same for different value vectors having the same i-th symbol.

16. The method of claim 1 wherein the critical characteristic further comprises an average value of a signal amplitude at a time of transmission of the i-th communication symbol.

17. The method of claim 1 wherein the critical characteristic further comprises a histogram distribution of a signal amplitude at a time of transmission of the i-th communication symbol.

18. The method of claim 1 wherein $1 < i < n$.

19. The method of claim 1 wherein $n \geq 3$.

20. The method of claim 1 wherein the symbols are binary.

21. The method of claim 4 wherein a given distorting effect is determined to be present if an inner product of a m-component characteristic vector formed of the reference values of the characteristic m symbol vectors, $2 \leq m \leq 2^n$, and the m-component characteristic vector associated with an effect, exceeds a threshold.

22. A device operative to recognize an effect distorting a communication signal in a serial communication channel transmitting a plurality of successive symbols in successive symbol periods, comprising:
   an input operative to receive the distorted communication signal from the communication channel;
   a detector connected to the input operative to detect a feature in a symbol of the distorted communication signal and to output the detected feature, the detected feature comprising a feature selected from the group consisting of whether the symbol was received correctly or incorrectly, and whether a signal amplitude for the symbol thresholded against a variable amplitude matches the signal amplitude for the symbol thresholded against a reference amplitude;
   a demultiplexer having a data input connected to the output of the detector and outputting the detected feature and having a plurality of control inputs which have differently delayed symbols (i−1; i; i+1, where i is a relative symbol period index) of the communication signal applied to them in order to switch the detected feature present at the input of the demultiplexer to an output of the demultiplexer specified by the symbols present at the control inputs; and
   an evaluating unit at each output of the demultiplexer comprising at least one counter associated with each output of the demultiplexer.

23. The device of claim 22 further comprising a source for a communication signal which is assumed to be in agreement with an undistorted communication signal, and wherein the control inputs of the demultiplexer have the communication symbols assumed in agreement applied to them.

24. The device of claim 22 wherein the at least one counter comprises a first counter operative to count how often a signal which indicates correct/incorrect receipt of a symbol was switched to the evaluating unit.

25. The device of claim 24 wherein the at least one counter further comprises a second counter operative to count how often the output of the demultiplexer associated to the evaluation unit is selected.

26. The device of claim 22 wherein the detected feature indicates for each symbol the signal amplitude thereof, and wherein the evaluating unit comprises a circuit for forming an average of the signal amplitude.

27. The device of claim 22 wherein the detected value indicates for each symbol the signal amplitude thereof, and wherein the evaluating unit comprises a circuit for forming a histogram of the signal amplitude.

\* \* \* \* \*

UNITED STATES PATENT AND TRADEMARK OFFICE
CERTIFICATE OF CORRECTION

PATENT NO. : 8,228,974 B2  
APPLICATION NO. : 11/577284  
DATED : July 24, 2012  
INVENTOR(S) : Poirrier et al.

Page 1 of 1

It is certified that error appears in the above-identified patent and that said Letters Patent is hereby corrected as shown below:

In the Specifications:

In Column 6, Line 30, delete "demultimplexer" and insert -- demultiplexer --, therefor.

In Column 6, Line 44, delete "has" and insert -- 10 has --, therefor.

In Column 9, Line 23, delete "dempultiplexer" and insert -- demultiplexer --, therefor.

In Column 9, Line 49, delete "23," and insert -- 28, --, therefor.

In the Claims:

In Column 14, Line 47, in Claim 9, delete "of one of claim" and insert -- of claim --, therefor.

Signed and Sealed this  
Thirtieth Day of April, 2013

Teresa Stanek Rea  
*Acting Director of the United States Patent and Trademark Office*